United States Patent [19]

Bertino, III et al.

[11] Patent Number: 4,601,664

[45] Date of Patent: Jul. 22, 1986

[54] TEMPOROMANDIBULAR JOINT ARTICULATOR AND DENTAL MANIKIN INCORPORATING IT

[75] Inventors: Cosmo D. Bertino, III, Norristown; N. Dominic Marucci, Philadelphia, both of Pa.

[73] Assignee: Syntex (U.S.A.) Inc., Palo Alto, Calif.

[21] Appl. No.: 712,482

[22] Filed: Mar. 18, 1985

[51] Int. Cl.⁴ .............................................. G09B 23/28
[52] U.S. Cl. ..................................................... 434/264
[58] Field of Search ................................. 434/263, 264

[56] References Cited

U.S. PATENT DOCUMENTS

| 451,061 | 4/1891 | Magnusson | 434/264 |
|---|---|---|---|
| 728,818 | 5/1903 | Wright | 434/264 |
| 760,943 | 5/1904 | Wright | 434/264 |
| 1,166,796 | 1/1916 | Weisse | 434/264 |
| 1,215,087 | 2/1917 | Weisse | 434/264 |
| 1,916,376 | 7/1933 | Köhler | 434/264 |
| 2,103,058 | 12/1937 | Burtenshaw | 434/264 |
| 2,203,891 | 6/1940 | Burtenshaw | 434/264 |
| 3,520,060 | 7/1970 | Crabtree et al. | 434/264 |
| 3,931,679 | 1/1976 | Carter | 434/264 |
| 4,067,109 | 1/1978 | Engeser | 434/264 |

OTHER PUBLICATIONS

Catalog No. 66, Columbia Dentoform Corp., ©1983, pp. 13, 27–29.
Brochure, "Dental Schools", Kaltenbach & Voigt KG, 1983(?) pages showing dental manikins and articulators.
Brochure, "Dental School Equipment", Kaltenbach & Voigt KG, 1981(?) pages showing dental manikins.
Brochure, "Enraf-Nonius Phantom Master", Enraf-Nonius, undated.

*Primary Examiner*—Harland S. Skogquist
*Attorney, Agent, or Firm*—Derek P. Freyberg

[57] ABSTRACT

A temporomandibular joint (TMJ) articulator, capable of simulating common dental occlusion defects, has a maxillary frame on which may be releasably retained a maxillary practice denture, jaw movement guides slidably attached at the left and right sides of the frame, the lower end of each guide having a shaped recess functionally simulating a human TMJ socket, and a mandibular assembly having arcuate left and right jaw plates each bearing a slidably mounted roller and a condyle, the roller and condyle cooperating with the shaped recess to functionally simulate a human TMJ, and the assembly including means for releasably retaining a mandibular practice denture. The articulator is designed to fit within a dental manikin head, especially suitable for student training, which incorporates a solid skull and a flexible face, the face optionally having a tubular waste drain integral therewith.

14 Claims, 11 Drawing Figures

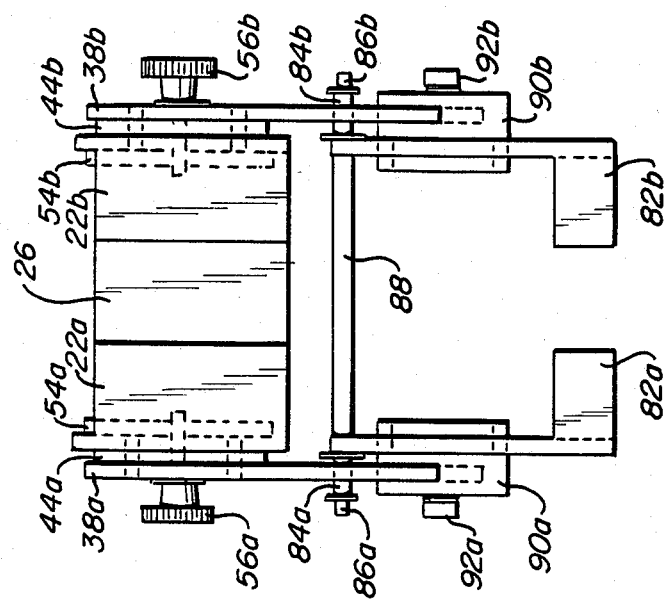
FIG._2.
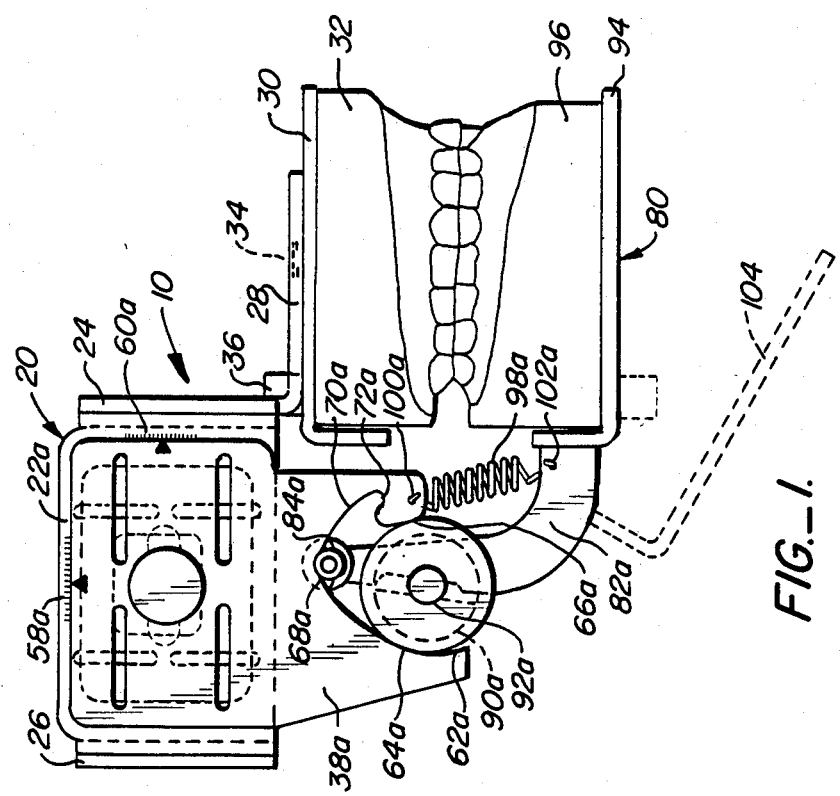
FIG._1.

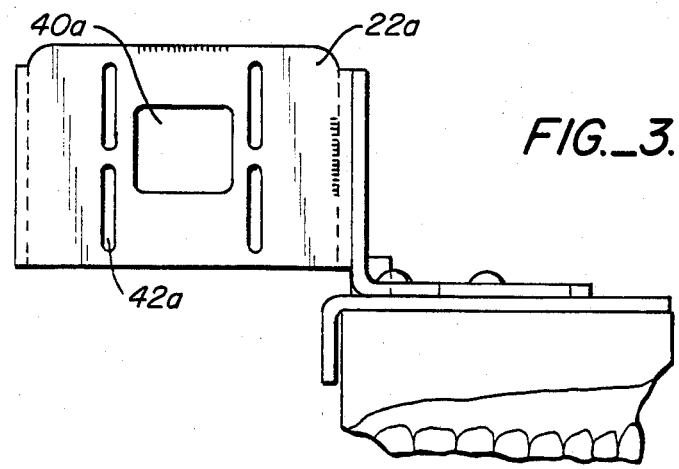
FIG._3.
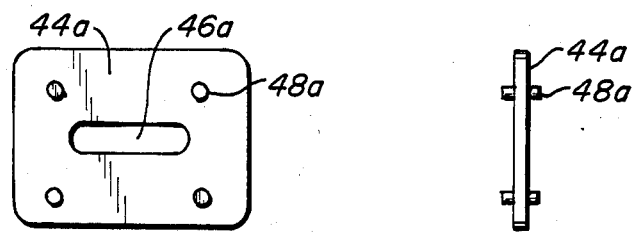
FIG._4A.      FIG._4B.
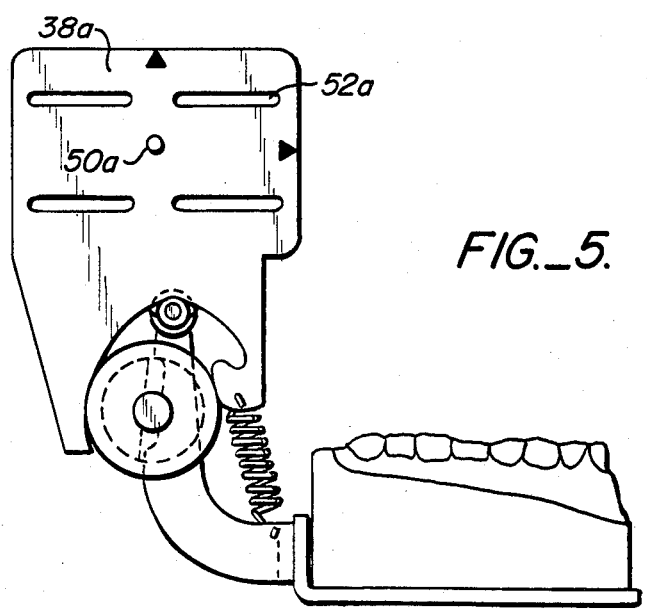
FIG._5.

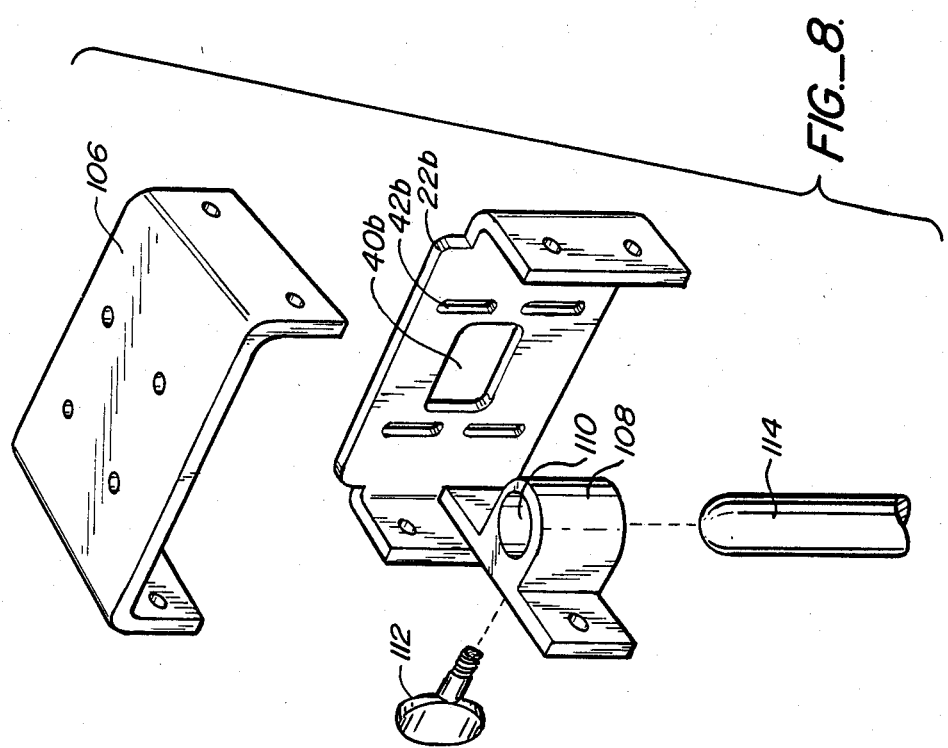
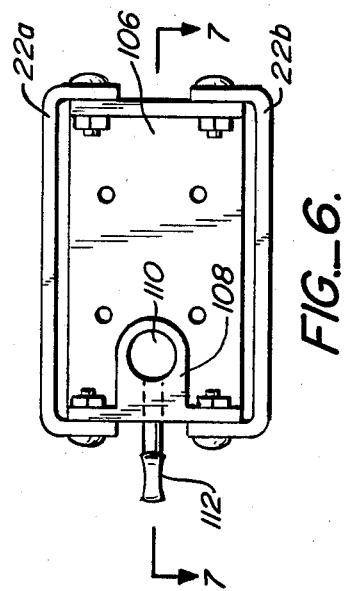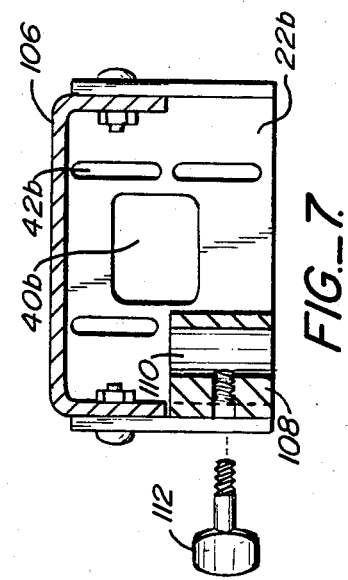

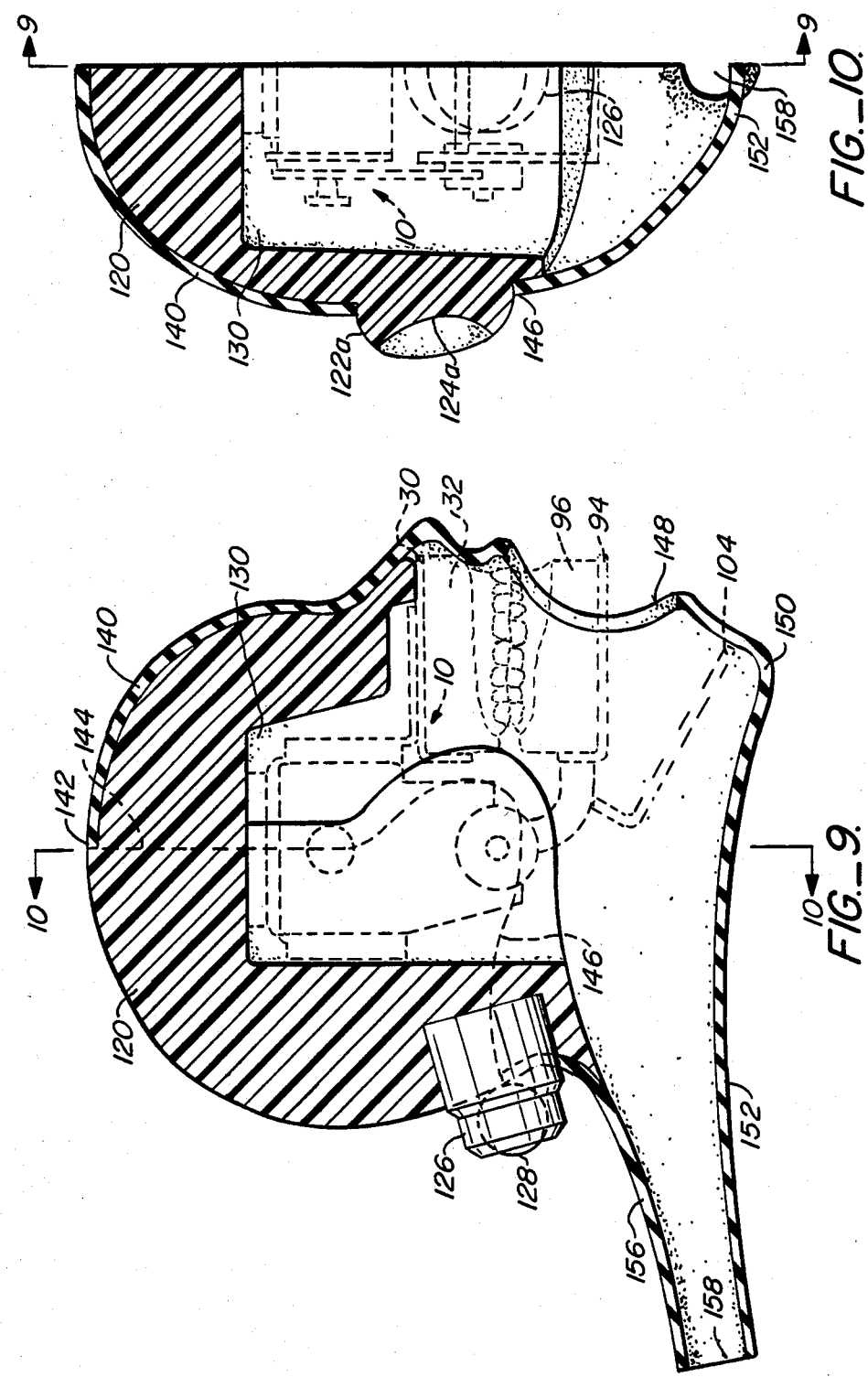

TEMPOROMANDIBULAR JOINT ARTICULATOR AND DENTAL MANIKIN INCORPORATING IT

BACKGROUND OF THE INVENTION

1. Field of the Invention

This invention relates to dental patient simulators suitable, for example, for the preclinical training of dental students. In particular it relates to a temporomandibular joint (TMJ) articulator and a dental manikin incorporating it.

2. Background to the Invention

With the ever-increasing cost of dental education, and the dental health of the general populace improving with water fluoridation, etc., preclinical training of dental students and the examination of dentists for qualification to practice require patient simulators of a high degree of realism. Functional realism is especially important, but a realistic appearance is desirable to maximize the realism of the practice setting.

U.S. Pat. No. 3,931,679 to Carter describes a dental patient simulator with a flexible facial covering over a rigid skull, while U.S. Pat. No. 4,067,109 to Engeser discloses a dummy head for dental teaching with a removable jaw section. The disclosures of both these patents are incorporated by reference herein.

It would be desirable to provide, within the setting of a realistic dental manikin, an articulator which not only opens and closes but also may simulate various defects of occlusion, so that the dental practice may include orthodontics and/or dental operations under non-ideal occlusal conditions.

DESCRIPTION OF THE INVENTION

Summary of the Invention

In a first aspect, this invention provides a TMJ articulator comprising:

(a) a maxillary frame having at least left, right, and front sides;

(b) means attached to the front side of the maxillary frame for retaining a maxillary practice denture;

(c) jaw movement guides slidably attached to the left and right sides, respectively, of the maxillary frame, each of the jaw movement guides being provided with a shaped recess in a lower end thereof;

(d) a mandibular assembly comprising, for each jaw movement guide,
 (i) a jaw plate having an upper and a lower end;
 (ii) a roller, slidably attached to the jaw plate;
 (iii) a condyle, attached to the jaw plate at the upper end thereof; and
 (iv) tension means, attached between proximate the lower end of the jaw plate and the lower end of the corresponding jaw movement guide;
the roller and condyle being attached to the jaw plate to cooperate with the shaped recess in the jaw movement guide to simulate a human temporomandibular joint; and (e) means connecting the jaw plates which connecting means also comprises means for retaining a mandibular practice denture.

In a second aspect, this invention provides a dental manikin head comprising:

(a) a rigid simulated upper skull excluding the maxilla, the skull including simulated external ears, and having means therein for releasably accepting a dental articulator;

(b) a dental articulator comprising a maxilla and a mandible movable with respect thereto, the articulator being fastened within the simulated skull; and (c) a covering skin simulating the human skin and covering the area forward or below the external ears of the skull, and including a mouth portion, the skin forming with the articulator maxilla and mandible a mouth cavity to which access is had only through the mouth portion.

Preferably the articulator of this second aspect is the articulator of the first aspect of the invention.

BRIEF DESCRIPTION OF THE DRAWING

FIG. 1 is a side view of the TMJ articulator of this invention, shown with mounting plates and practice dentures.

FIG. 2 is a front view of the articulator without mounting plates and practice dentures.

FIGS. 3 through 5 illustrate the construction of the right side of the articulator, where FIG. 3 is a side view of the maxillary frame, FIGS. 4A and 4B are side and front views of the constant assembly, and FIG. 5 is a side view of the jaw movement guide.

FIGS. 6 through 8 illustrate an alternative assembly of the maxillary frame, where FIG. 6 is a bottom view of the frame, FIG. 7 is a cross-section on line 7—7 of FIG. 6, and FIG. 8 is an exploded view.

FIGS. 9 and 10 illustrate the articulator mounted in the manikin head of this invention, where FIG. 9 is a cross-section along the left-right centerline of the head (line 9—9 of FIG. 10), and FIG. 10 is a half-cross-section on line 10—10 of FIG. 9.

THE ARTICULATOR

FIG. 1 is a side view of the TMJ articulator of this invention, showing the assembly of the articulator together with a set of practice dentures mounted thereon, while FIG. 2 is a front view of the articulator, seen without the practice dentures or their mounting plates, and FIGS. 3 through 5 illustrate the components of articulator which provide the vertical and horizontal adjustment of the occlusion. As many of the components of the articulator are shown in more than one Figure, reference may be made to the appropriate Figure for the optimum view of the components and construction discussed below.

The articulator shown generally at 10 comprises a maxillary assembly shown generally at 20 and a mandibular assembly shown generally at 80, the mandibular assembly cooperating with the maxillary assembly to simulate a human TMJ.

The maxillary frame shown generally at 20 has at least left, right, and front sides, represented by side fixed plates 22a and 22b, and front plate 24 respectively. The frame may also have a rear plate 26. Fastening means (not shown, as any suitable means may be used) hold the fixed plates, front plate, and optional rear plate together to form the maxillary frame. The front plate, forming the front side of the frame, is provided with retaining means for (preferably releasably) retaining a maxillary practice denture. These retaining means are shown in FIGS. 1 and 3 as a horizontal extension 28 of the front plate 26 at its lower end, and an upper mounting plate 30 mounted thereon. A maxillary practice denture 32 of conventional design, bearing artificial teeth fixed in a suitable manner within a rigid thermoplastic plate and including, for example, simulated gingival and palatal tissue of a flexible thermoplastic, is mounted on maxillary mounting plate 30.

The precise manner of mounting the practice dentures on the articulator will be a matter of choice, and several suitable methods are well-known to those of ordinary skill in the art, as evidenced for example by catalogs of dental models. A particularly preferred method in the teaching setting is the use of mounting plates on the articulator and headed latching pins on the dentures, of which the head 34 is shown in the maxillary denture, moving in key-shaped recesses within the mounting plates with, optionally, a locking pin or ball-and-socket detent 36, or similar locking means to hold the denture in place. This method, illustrated in U.S. Pat. No. 4,067,109 for the releasable connection of a jaw to a skull in a dental manikin, provides for ready removability of the practice dentures from the articulator.

A simulative soft palate or velum (not shown) may optionally be attached to the maxillary frame, desirably at the rear of the maxillary denture mounting plate 30, to provide greater realism in use.

The maxillary frame 20 will desirably be provided, e.g. in the back plate 26, with mounting means (not shown) to enable the articulator to be fastened within a manikin head, as will be discussed later, or onto a support rod to bring it into a suitable position for use.

The left and right sides of the maxillary frame have jaw movement guides 38a and 38b slidably attached thereto. The frame, and the various attachments thereto, being mirror-imaged between the right and left sides of the articulator, only a single guide will be discussed in detail and is shown in FIGS. 3 through 5. The guides are independently slidable with respect to the maxillary frame to permit simulation of defects of occlusion, ankyloses, etc., as will be further discussed below. An exemplary suitable method of attachment, which permits translational but not rotational motion of the guide with respect to the maxillary frame, is shown assembled in FIGS. 1 and 2 and disassembled in FIGS. 3 through 5. Fixed plate 22a (FIG. 3) is provided with a central aperture 40a, the size of which defines the limits of the translational adjustment. Four vertical slots 42a are machined in the plate. A constant plate 44a (FIGS. 4A,4B) has a central horizontal slot 46a and four pins 48a, capable of engagement with slots 42a. The constant plate 44a thus is capable of vertical, but not horizontal, translation with respect to plate 22a, when mounted thereon. Jaw movement guide 38a is provided with a central hole 50a and four horizontal slots 52a, sized to match the pins 48a of constant plate 44a. Movement guide 38a is thus capable of horizontal, but not vertical, translation with respect to constant plate 44a when mounted thereon; and is thus capable of both vertical and horizontal translation (without rotation) with respect to maxillary frame 20. The movement guide 38a and constant plate 44a are fastened to the maxillary frame side plate 22a by means of a securing plate 54a having a threaded central aperture therein and an adjustment screw 56a which engages the central aperture to tigthen the assembly together. When screw 56a is partially released, guide plate 38a may slide with respect to the frame 20, and a set of scales and pointers 58a and 60a may be provided to measure the extent of the translations. A similar set of scales and pointers may, of course, be provided on the left side.

It is desirable that the movement guides 38a and 38b be slidably but not rotatably mounted on the maxillary frame, as shown here, to simplify adjustment of the articulator. Other mechanical equivalents, for example, three rather than four slots, grooves rather than slots, ball bearings rather than pins, etc. are readily conceivable to one skilled in the art having regard to this disclosure, and are intended to be comprehended herein.

The lower end of movement guide 38a is provided with a shaped recess defined by 62a which functionally simulates the socket of a human TMJ, with point 64a being the principal bearing point of the mandibular roller (see below), point 66a being an optional bearing point, and points 68a and 70a representing the limits of normal travel of the simulated condyle.

The mandibular assembly shown generally at 80 comprises jaw plates 82a and 82b of generally arcuate configuration, each having an upper and a lower end.

The upper end of jaw plate 82a is provided with a rotatably mounted condyle 84a, which is preferably elliptical. Fastening screw 86a locks condyle 84a against rotation with respect to jaw plate 82a. The condyles 84a and 84b are preferably mounted on a common axle 88 for mechanial simplicity and strength, though this is not essential. A slotted roller 90a is slidably attached to jaw plate 84a, and locked by fastening screw 92a.

The two jaw plates 82a and 82b are connected by a connecting means shown in FIGS. 1 and 5 as a lower mounting plate 94 for (preferably releasably) retaining a mandibular practice denture 96 in a manner similar to that employed for the maxillary practice denture 32. A simulated tongue (not shown) may be provided, for example, at the rear of the mandibular practice denture.

The mandibular assembly is attached to the jaw guide plates by tension means, for example, a spring 98a between holes 100a (in the jaw movement guide 38a) and 102a (proximate the lower end of the jaw plate 82a); and a corresponding spring on the left side. When the articulator is assembled, roller 90a rides on the curve 62a at the lower end of the jaw movement guide 38a, contacting point 64a (and optionally point 66a).

Condyle 84a, at the upper end of the jaw plate 82a, contacts curve 62a at point 68a when the articulator is "closed", and the normal opening of the articulator, shown by dotted lines 104, is completed by the condyle 84a reaching point 70a of the curve 62a. The articulator simulates the true gliding action of the human TMJ by the two point contact of the roller and the condyle with the curve 62a rather than simple pivoting about the condyle.

By simultaneous adjustment of the left and right horizontal motions, an over- or underbite may be simulated; while simultaneous adjustment of the vertical motions (with optional adjustment of the rollers), simulates an open or closed bite. Cross-bites may be simulated by adjustment of one horizontal motion relative to the other. If the condyles are elliptical, in cross-section, as is preferred, they may be rotated from a position with the minor axis of the ellipse approximately vertical (normal position, as shown in FIGS. 1 and 5) to a position with the major axis approximately vertical (a corresponding adjustment of the roller is required). This effectively lengthens the mandible. Adjustment of one roller and condyle may siumlate ankyloses or TMJ tumors, by forcing a sideways tilted motion of the mandible. In such cases, the condyle 84a may travel as far as the end 72a of the curve 62a.

If only the translational motions have been adjusted, the articulator may easily be returned to correct occlusion simply by loosening the adjustment screws 56a, 56b and squeezing the practice dentures together in correct occlusion. The adjustment screws may then be tightened.

An alternative assembly of the maxillary frame is shown in FIGS. 6 through 8.

FIG. 6 is a bottom view of the maxillary frame with a top plate 106 fastened between side fixed plates 22a and 22b, and showing a back plate 108 alternative to back plate 26 which comprises a post mounting bracket having a post hole 110. A post passing through the hole 110 may be locked in place by a wing bolt 112.

FIG. 7 is a side view on line 7—7 of FIG. 6, illustrating more clearly the top plate 106.

FIG. 8 is an exploded view of a part of the assembly of the maxillary frame, including a post 114 which passes through hole 110.

The articulator may also be fitted with a locking mechanism (not shown) to hold it in an "open" position for practice use. Such mechanism may be of any kind conventional in the art and compatible with the articulator design.

Because of the construction of the condyles and rollers, the mandibular assembly is free to "float" to simulate bruxism and to allow the deliberate grinding of teeth in the practice dentures for occlusal marking.

THE MANIKIN HEAD

The dental manikin head that constitutes the second part of this invention is shown in FIGS. 9 and 10, with the articulator (previously discussed) mounted therein.

The manikin per se has two components; a rigid upper skull excluding the maxilla, and including simulated external ears; and a covering skin which covers the area forward or below the external ears and simulates the face and throat of a dental patient. The mouth portion of the skin, together with the articulator of the present invention and practice dentures, forms a mouth cavity suitable for simulated dentistry.

FIG. 9 is a cross-section along the center line of the head (line 9—9 of FIG. 10) illustrating the manikin head with an articulator and practice dentures therein, while FIG. 10 is a half-cross-section on line 10—10 of FIG. 9.

The manikin head comprises a rigid simulated upper skull 120 excluding the maxilla. This skull is desirably made of a relatively light, tough material, e.g. a rigid thermoplastic such as polycarbonate, ABS, nylon, polyolefin, etc. It includes simulated external ears 122a, 122b which may be provided with depressions 124a, 124b simulating the external auditory canals and suitable for face-bow exercises. By the provision of an external reference point in the rigid skull which is not covered by the flexible face, it is possible to ensure constancy of measurement when the articulator is mounted in the skull, whether the flexible face is present or not, in contrast to prior art manikins which have used reference points which are either on or covered by the flexible portions, and thus easily lose measurement constancy.

That portion of the rigid simulated skull 120 which lies to the rear of and above the ears is exposed, i.e. not covered by a skin covering in use and is therefore desirably contoured and/or colored to simulate the human head in that region.

The skull 120 is provided at the lower rear thereof with a means of preferably pivotal attachment to a suitable mounting, e.g. a simulated chair back or other such mounting devices as are known in the art. Here, the means of attachment is illustrated as a socket 126 which retains a ball 128, the ball being rigidly fastened to the desired mounting. By appropriate dimensioning of the socket, the rotation of the ball on its support within the socket may be restricted to simulate the limited range of movement of a dental patient's head.

The skull is provided with an internal cavity 130, within which may be mounted an articulator shown generally at 10, e.g. the TMJ articulator described above. The articulator is mounted by any suitable means within cavity 130, for example at the top or back thereof, so that the maxillary practice denture 32 on its mounting plate 30 are located anatomically correctly with respect to the skull. Mandibular practice denture 96 on its mounting plate 94 is then free to move between its "closed" position and an "open" position 104.

A covering skin 140 covers the forehead and upper face region of the skull and is fastened thereto, typically at points such as 142 near its edge. The fastening means may include, e.g. protrusions on the skin engaging depressions on the skull (as illustrated in U.S. Pat. No. 3,931,679), corresponding strips of Velcro TM or similar material of removably adhesive nature, etc., as desired. The fastening means may be provided at desired points along the rearward 144 and upward 146 edges of the covering skin 140, to the extent necessary to firmly but removably attach the covering skin to the skull 120.

The covering skin, being simulative of human facial and scalp tissue, is composed of an elastic material such as urethane, rubber, polyvinyl chloride, polysiloxane ("silicone rubber"), and simulates the skin and underlying tissues as to feel and thickness. It is desirably tinted or colored in imitation of corresponding human skin portions.

The covering skin extends below the skull 120 to provide a mouth portion 148 simulative of an open human mouth, and extends down to a chin 150 and rearwards to simulate the external throat 152. The upper edge 146 of the covering skin extends towards the rear of the skull to a point 154 adjacent the attachment socket 126. To provide for a waste drain for water, etc. from practice dental operations, the skin 140 desirably extends rearward from 152 and 154 into a tube 156 having an end 158 to which may be attached a waste or suction line. When the manikin is placed in a reclining position, as is conventional for dentistry today, fluids from the mouth region will flow into the tube 156 by gravity.

Although the covering skin 140 is easily removable from the skull 120 to enable adjustment/removal of the articulator 10, when the skin is in place, access may be had to the practice dentures 32 and 96 only through the mouth portion 148, and, particularly with a simulated soft palate and tongue present, the simulation of the shape and "feel" of a human oral cavity will be excellent, providing for realistic training of dental students, for example.

The articulator may be made capable of accomodating both pedodontic or adult practice dentures; or, preferably, both the articulator and manikin may be made in sizes specifically to accomodate either pedodontic or adult practice dentures, so that the dental student faces the maximum realism in training, including realistic oral cavity sizes.

Although the invention has been described with respect to a preferred embodiment thereof, it is not so limited since changes and modifications may be made, or equivalents employed, therein by those of ordinary skill in the art having regard to this disclosure. Such changes, modifications and equivalents are intended to be within the scope of the invention as defined solely by the appended claims and their lawful equivalents.

What is claimed is:

1. A temporomandibular joint articulator comprising:
   (a) a maxillary frame having at least left, right, and front sides;
   (b) means attached to the front side of the maxillary frame for retaining a maxillary practice denture;
   (c) jaw movement guides slidably attached to the left and right sides, respectively, of the maxillary frame, each of the jaw movement guides being provided with a shaped recess in a lower end thereof;
   (d) a mandibular assembly comprising, for each jaw movement guide,
      (i) a jaw plate having an upper and a lower end;
      (ii) a roller, slidably attached to the jaw plate;
      (iii) a condyle, attached to the jaw plate at the upper end thereof; and
      (iv) tension means, attached between proximate the lower end of the jaw plate and the lower end of the corresponding jaw movement guide;
      the roller and condyle being attached to the jaw plate to cooperate with the shaped recess in the jaw movement guide to simulate a human temporomandibular joint; and
   (e) means connecting the jaw plates, which connecting means also comprises means for retaining a lower practice denture.

2. The articulator of claim 1 wherein the condyles (d)(iii) are mounted on a common axle.

3. The articulator of claim 1 wherein the retaining means (b) is a releasable retaining means.

4. The articulator of claim 1 wherein the retaining means comprises a mounting plate having keyed recesses for engagement with matching protrusions on a maxillary denture.

5. The articulator of claim 1 wherein the connecting means (e) is a releasable connecting means.

6. The articulator of claim 1 wherein the connecting means comprises a mounting plate having keyed recesses for engagement with matching protrusions on a mandibular denture.

7. The articulator of claim 1, further comprising:
   (f) means attached to the maxillary frame (a) for mounting the articulator to a support structure.

8. The articulator of claim 7 wherein the mounting means (f) comprises means for engagement with a support rod.

9. The articulator of claim 7 wherein the mounting means (f) comprises means for mounting the articulator to a dental manikin head.

10. The articulator of claim 1 wherein the slidable attachment of the jaw movement guides (c) to the maxillary frame (a) permits translation but not rotation of the guides with respect to the frame.

11. The articulator of claim 10, further comprising:
    (g) measuring means, associated with the jaw movement guides (c) and the maxillary frame (a) to measure the relative positions thereof.

12. The articulator of claim 1 wherein each jaw plate (d)(i) is of generally arcuate configuration.

13. The articulator of claim 1 wherein each condyle (d)(iii) is of elliptical cross-section.

14. A dental manikin head comprising:
    (a) a rigid simulated upper skull excluding the maxilla, the skull including simulated external ears, and having means therein for releasably accepting a dental articulator;
    (b) a dental articulator comprising a maxilla and a mandible movable with respect thereto, the articulator being fastened within the simulated skull; and
    (c) a covering skin simulating the human skin and covering the area forward or below the external ears of the skull, and including a mouth portion, the skin forming with the articulator maxilla and mandible a mouth cavity to which access is had only through the mouth portion.

* * * * *